US000001523H

United States Statutory Invention Registration [19]

[11] Reg. Number: H1523

[45] Published: Apr. 2, 1996

Mammone et al.

[54] METHOD OF MAKING A POLYMER FILM HAVING A CONDUCTIVITY GRADIENT ALONG ITS THICKNESS AND POLYMER FILM SO MADE

[75] Inventors: Robert J. Mammone, S. Plainfield, N.J.; Michael Binder, Brooklyn, N.Y.

[73] Assignee: The United States of America as represented by the Secretary of the Army, Washington, D.C.

[21] Appl. No.: 28,481

[22] Filed: Mar. 8, 1993

[51] Int. Cl.[6] ..... H01B 1/20

[52] U.S. Cl. ..... 264/104; 264/105; 264/204; 252/500

[58] Field of Search ..... 264/105, 104, 264/204; 252/500

[56] References Cited

U.S. PATENT DOCUMENTS

| | | | |
|---|---|---|---|
| 4,803,096 | 2/1989 | Kuhn et al. | 252/500 |
| 4,851,487 | 7/1989 | Yaniger et al. | 252/500 |
| 4,935,164 | 6/1990 | Wessling et al. | 252/500 |
| 4,935,181 | 6/1990 | Theophilou et al. | 264/104 |
| 4,983,690 | 1/1991 | Cameron et al. | 252/500 |
| 5,151,221 | 9/1992 | Osterholm et al. | 264/104 |
| 5,162,135 | 11/1992 | Gregory et al. | 252/500 |
| 5,186,860 | 2/1993 | Joyce, Jr. et al. | 252/500 |
| 5,217,649 | 6/1993 | Kulkarni et al. | 252/500 |

FOREIGN PATENT DOCUMENTS

| | | | |
|---|---|---|---|
| 61-279001 | 12/1986 | Japan | 264/104 |
| 62-15231 | 1/1987 | Japan | 264/104 |
| 63-19705 | 1/1988 | Japan | 264/104 |
| 63-264641 | 11/1988 | Japan | 264/104 |

*Primary Examiner*—Donald P. Walsh
*Assistant Examiner*—Chrisman D. Carroll
*Attorney, Agent, or Firm*—Michael Zelenka; Roy E. Gordon

[57] ABSTRACT

A polymer film having a conductivity gradient across its thickness is made from a mixed solution of an insulating polymer, A and a polymer, B that can be made conducting by doping or protonation by a method including the steps of:

(A) mixing the solution of the insulating polymer, A and the polymer, B that can be made conducting by doping or protonation, (B) casting the mixed solution together as a solid composite film, and (C) exposing the film to a treating agent that can dope or protonate polymer B and make polymer B conductive and create a conductivity gradient across the thickness of the polymer films.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MAKING A POLYMER FILM HAVING A CONDUCTIVITY GRADIENT ALONG ITS THICKNESS AND POLYMER FILM SO MADE

GOVERNMENT INTEREST

The invention described herein may be manufactured, used, and licensed by or for the Government for governmental purposes without the payment to us of any royalties thereon.

FIELD OF INVENTION

The invention relates in general to a method of making an improved polymer film and in particular to such a method wherein a conductivity gradient is created across the thickness of the polymer film.

BACKGROUND OF THE INVENTION

One of the difficulties in preparing film to be used in metallized film or film foil capacitor has been that electric field gradients applied across the film thickness are large. This is because the conducting metal film or foil is contacting the generally insulating polymer directly. The extremely high electric field gradient can cause premature electrical breakdown.

SUMMARY OF THE INVENTION

An object of this invention is to overcome the aforementioned difficulty and to prepare improved films that will be used in metallized or film foil capacitors. A further object of the invention is to provide such a film foil capacitor wherein the polymer conductivity is graded across its thickness and wherein electric field gradient applied across the film thickness will not be as sharp as if a conducting metal were contacting an insulating polymer directly. A still further object of the invention is to replace metallized films or metal foil in electrical contact in capacitors and create an all-polymer capacitor. Another object of the invention is to fabricate optically transparent polymer films having a gradient in refractive index.

It has now been found that the aforementioned objects can be achieved by providing a method for making polymer film that has a conductivity gradient across the polymer film thickness. The volume conductivity is high near the film surface and decreases as a function of distance into the polymer film. In the method, a mixed solution of an insulating polymer, A, and another polymer, B, that can be made conducting by doping or protonation, is cast together as a solid composite film. The cast, solid polymer film, containing uniformly dispersed polymer A and polymer B is nonconducting. This film is then exposed to a treating agent in the form of a specific solution or gas that is capable of doping or protonating polymer B and, in the process, making polymer B conducting. The treating agent has no effect on polymer A. Since the treating agent in the form of a solution or gas diffuses into the polymer composite and only converts polymer B to its conducting form, polymer A remains nonconducting. However, since the treating agent, that is, gas or solution, diffuses into the bulk of the composite polymer as a function of time, polymer B molecules near the surface region become converted to the conducting form. The bulk of the polymer composite film remains nonconductive. Thus, a sandwich is formed of a thin conductive region on each side of a nonconductive film.

The method is particularly useful in preparing films that are to be used in metallized or film foil capacitors. Because the polymer conductivity is graded (or slowly decreases as a function of depth) across its thickness, electric field gradients applied across the film thickness are not as sharp as if a conducting metal were contacting an insulating polymer directly. Decreased electric field gradients are desirable in that they increase electric field breakdown strengths and capacitor reliability.

The method can be used to replace metallized films or metal foils as electrical contacts in capacitors and create all polymer capacitors.

The polymer films may also be used in making optically transparent polymer films having a gradient in refractive index.

DESCRIPTION OF THE PREFERRED EMBODIMENT

A solution of polycarbonate, PC, is dissolved in a suitable solvent (such as mixtures of methylene chloride and chloroform) and approximately ,10% of poly-o-methoxyaniline, POMA, is added. A film is then cast from the above solution mixture and allowed to dry. The film is then exposed to HCl gas as the treating agent. Almost immediately, the film color changes from purple to green. Since HCl is known to protonate POMA and convert it to the conductive form, the observed color change is indicative of a conductivity change due to the conductive POMA. However, the measured bulk dielectric constant of the composite film does not change. This is an indication that POMA molecules in the bulk of the composite film have not yet become converted to the conductive form. Had these POMA molecules become converted to the conductive form, (perhaps after longer exposure times to the HCl) the dielectric constant of the bulk composite film would have risen sharply. This indicates that the observed color change in the film is due to changes in conductivity of primarily those POMA molecules near the film surface.

Applicants point out that similar effects can be obtained by coating an existing polymer film of any polymer, with a solution of POMA and PC in a suitable solvent, allowing it to dry, and then reacting it with HCl or another protonating agent. The POMA will become conducting and create a surface layer whose conductivity decreases as a function of depth into the bulk polymer.

We wish it to be understood that we do not desire to be limited to the exact details of construction shown and described for obvious modification will occur to a person skilled in the art.

What is claimed is:

1. Method of making a polymer film that has a conductivity gradient across its thickness from a mixed solution of an insulating polymer, A, and a polymer, B that can be made conducting by doping or protonation, said method including the steps of (A) mixing the solution of the insulating polymer A, and the polymer, B that can be made conducting by doping or protonation, (B) casting the mixed solution together as a solid composite film, and (C) exposing the film to a treating agent that can dope or protonate polymer B and make polymer B conductive and create a conductivity gradient across the thickness of the polymer film.

2. Method according to claim 1 wherein the treating agent is a dopant.

3. Method according to claim 1 wherein the treating agent is a protonator.

4. Method according to claim 1 wherein the treating agent is allowed to diffuse into the solid composite film as a function of time causing the polymer B molecules near the surface region to be converted to the conducting form.

5. Method according to claim 3 wherein the treating agent protonator is HCl gas and polymer B is "POMA" (poly-o-methoxyaniline).

* * * * *